(12) United States Patent
Miao et al.

(10) Patent No.: US 11,710,293 B2
(45) Date of Patent: Jul. 25, 2023

(54) TARGET DETECTION METHOD AND APPARATUS, COMPUTER-READABLE STORAGE MEDIUM, AND COMPUTER DEVICE

(71) Applicant: Tencent Technology (Shenzhen) Company Limited, Shenzhen (CN)

(72) Inventors: Jie Miao, Shenzhen (CN); Chen Ran, Shenzhen (CN); Dianping Xu, Shenzhen (CN); Xiaoyi Jia, Shenzhen (CN); Mei Jiang, Shenzhen (CN); Yugeng Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 408 days.

(21) Appl. No.: 17/020,636

(22) Filed: Sep. 14, 2020

(65) Prior Publication Data

US 2020/0410273 A1    Dec. 31, 2020

Related U.S. Application Data

(63) Continuation of application No. PCT/CN2019/098742, filed on Jul. 31, 2019.

(30) Foreign Application Priority Data

Aug. 24, 2018    (CN) .......................... 201810974541.2

(51) Int. Cl.
*G06V 10/20* (2022.01)
*G06N 3/08* (2023.01)
(Continued)

(52) U.S. Cl.
CPC .......... *G06V 10/255* (2022.01); *G06F 18/214* (2023.01); *G06N 3/08* (2013.01);
(Continued)

(58) Field of Classification Search
None
See application file for complete search history.

(56) References Cited

U.S. PATENT DOCUMENTS

2018/0060719 A1    3/2018    Kisilev et al.

FOREIGN PATENT DOCUMENTS

| CN | 106504223 A | 3/2017 |
|---|---|---|
| CN | 107423760 A | 12/2017 |

(Continued)

OTHER PUBLICATIONS

Tencent Technology, WO, PCT/CN2019/098742, Oct. 31, 2019, 3 pgs.

(Continued)

*Primary Examiner* — Leon Flores
(74) *Attorney, Agent, or Firm* — Morgan, Lewis & Bockius LLP

(57) ABSTRACT

This application relates to a target detection method performed at a computer device. The method includes: obtaining a to-be-detected image; extracting a first image feature and a second image feature corresponding to the to-be-detected image; performing dilated convolution to the second image feature, to obtain a third image feature corresponding to the to-be-detected image; performing classification and regression to the first image feature and the third image feature, to determine candidate position parameters corresponding to a target object in the to-be-detected image and degrees of confidence corresponding to the candidate position parameters; and selecting a valid position parameter from the candidate position parameters according to their corresponding degrees of confidence, and determining a position of the target object in the to-be- (Continued)

detected image according to the valid position parameter. The solutions in this application can improve robustness and consume less time.

20 Claims, 9 Drawing Sheets

(51) Int. Cl.
    *G06V 20/64*     (2022.01)
    *G06F 18/214*     (2023.01)
    *G06V 10/82*     (2022.01)
    *G06V 10/44*     (2022.01)
    *G06K 7/14*     (2006.01)

(52) U.S. Cl.
    CPC ............ *G06V 10/454* (2022.01); *G06V 10/82* (2022.01); *G06V 20/64* (2022.01); *G06K 7/1413* (2013.01); *G06K 7/1417* (2013.01); *G06V 2201/07* (2022.01)

(56) References Cited

FOREIGN PATENT DOCUMENTS

| | | |
|---|---|---|
| CN | 107563290 A | 1/2018 |
| CN | 108154196 A | 6/2018 |
| CN | 108171103 A | 6/2018 |
| CN | 108229455 A | 6/2018 |
| CN | 108229497 A | 6/2018 |
| CN | 108416250 A | 8/2018 |

OTHER PUBLICATIONS

Tencent Technology, IPRP, PCT/CN2019/098742, Mar. 2, 2021, 4 pgs.
Xiaoguang Cao et al., "Detecting of Foreign Object Debris on Airfield Pavement Using Convolution Neural Network", Image Processing Center, Beihang University, Haidian District, Beijing, China, Proceedings of SPIE, vol. 10605, Nov. 15, 2017, XP060098660, ISBN: 978-1-5106-1533-5, 7 pgs.
Extended European Search Report, EP19851718,7, dated Sep. 9, 2021, 8 pgs.
Yuguang Liu et al., "Multi-Path Region-Based Convolutional Neural Network for Accurate Detection of Unconstrained 'Hard Faces'", Department of Electrical and Computer Engineering, Center for Intelligent Machines, McGill University, Montreal, QC., Canada, Mar. 27, 2017, XP080759925, 11 pgs.
Yunchao Wei et al., "Revisiting Dilated Convolution: A Simple Approach for Weakly- and Semi-Supervised Semantic Segmentation", 2018 IEEE/CVF Conference on Computer Vision and Pattern Recognition, Jun. 18, 2018, XP033473646, 10 pgs.
Tencent Technology, ISR, PCT/CN2019/098742, Oct. 31, 2019, 2 pgs.

TARGET DETECTION METHOD AND APPARATUS, COMPUTER-READABLE STORAGE MEDIUM, AND COMPUTER DEVICE

CROSS REFERENCE TO RELATED APPLICATIONS

This application is a continuation application of PCT Patent Application No. PCT/CN2019/098742, entitled "TARGET DETECTION METHOD AND APPARATUS, COMPUTER-READABLE STORAGE MEDIUM, AND COMPUTER DEVICE" filed on Jul. 31, 2019, which claims priority to Chinese Patent Application No. 201810974541.2, entitled "TARGET DETECTION METHOD AND APPARATUS, COMPUTER-READABLE STORAGE MEDIUM, AND COMPUTER DEVICE" filed on Aug. 24, 2018, all of which are incorporated by reference in their entirety.

FIELD OF THE TECHNOLOGY

This application relates to the field of computer technologies, and in particular, to a target detection method and apparatus, a computer-readable storage medium, and a computer device.

BACKGROUND OF THE DISCLOSURE

With the development of computer technologies, people increasingly transmit information through images. As an important branch of image processing, target detection is intended for determining a position of a target object in an image.

According to a conventional target detection method, a position of a target object in an image is determined by searching the image for a locating point on the target object. For example, the target object is an QR code. The image is searched for a locating mark set at three vertices of the QR code, to determine the position of the QR code in the image. However, the conventional target detection method has poor robustness and consumes much time.

SUMMARY

Based on this, it is necessary to provide a target detection method and apparatus, a computer-readable storage medium, and a computer device, to resolve the technical problem of poor robustness and longtime consumption in the conventional technology.

According to an aspect, a target detection method is provided, applied to a computer device having a processor and memory storing a plurality of computer programs to be executed by the processor, the method including:
 obtaining a to-be-detected image;
 extracting a first image feature and a second image feature corresponding to the to-be-detected image;
 performing dilated convolution to the second image feature, to obtain a third image feature corresponding to the to-be-detected image;
 performing classification and regression to the first image feature and the third image feature, to determine candidate position parameters corresponding to a target object in the to-be-detected image and degrees of confidence corresponding to the candidate position parameters; and
 selecting a valid position parameter from the candidate position parameters according to their corresponding degrees of confidence, and determining a position of the target object in the to-be-detected image according to the valid position parameter.

According to another aspect, a non-transitory computer-readable storage medium is provided, the non-transitory computer-readable storage medium storing a plurality of computer programs. The computer programs, when executed by a processor of a computer device, cause the computer device to perform the steps in the foregoing target detection method.

According to yet another aspect, a computer device is provided, the computer device including memory and a processor, the memory storing a plurality of computer programs. The computer programs, when executed by the processor, cause the computer device to perform the steps in the foregoing target detection method.

According to the target detection method and apparatus, the non-transitory computer-readable storage medium, and the computer device mentioned above, a first image feature and a second image feature corresponding to a to-be-detected image are extracted, dilated convolution is then performed to the second image feature, to obtain a third image feature corresponding to the to-be-detected image, classification and regression are further performed to the first image feature and the third image feature, and a position of a target object in the to-be-detected image is determined according to a result of the classification and regression. In this way, image features corresponding to the to-be-detected image are automatically extracted, and classification and regression are performed to the extracted image features. Therefore, robustness of detection can be effectively improved and detection duration can be effectively shortened. In addition, a receptive field can be effectively expanded through dilated convolution, so that the method can better adapt to detection of target objects with different sizes.

BRIEF DESCRIPTION OF THE DRAWINGS

To describe technical solutions of embodiments of this application more clearly, the following briefly introduces the accompanying drawings required for describing the embodiments. Apparently, the accompanying drawings in the following description show only some embodiments of this application, and a person of ordinary skill in the art may still derive other drawings from the accompanying drawings without creative efforts.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are merely used for explaining this application but are not intended to limit this application.

Terms such as "first" and "second" used in this application are used for distinguishing similar objects from names. However, these objects are not limited by these terms. It is to be understood that these terms may be exchanged in a proper case without departing from the scope of this application. For example, a "first image feature" may be described as a "second image feature", and similarly, the "second image feature" may be described as the "first image feature".

In addition, the terms "including", "comprise", "having", or any other variant thereof, are intended to cover non-exclusive inclusion. For example, processes, methods, systems, products, or devices that include a series of steps or units are not limited to the steps or the units that are clearly listed, and may include other steps and units that are not clearly listed or that are essential for the processes, methods, products, or devices.

Figure 1:
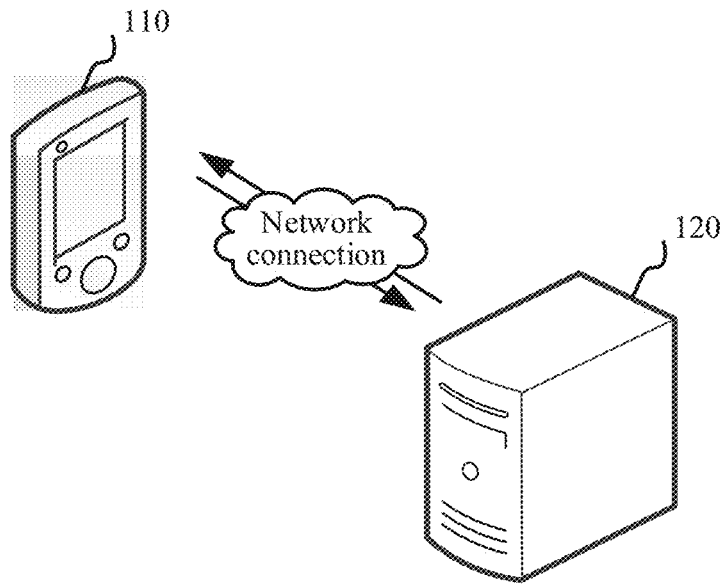
FIG. 1 is a diagram of an application environment of a target detection method according to an embodiment.

Target detection methods provided in the embodiments of this application may be applied to an application environment shown in FIG. 1. The application environment may involve a terminal 110 and a server 120. The terminal 110 and the server 120 may be connected by using a network.

Model training may be completed on the server 120, to obtain a predetermined neural network with a target detection capability. Then, the predetermined neural network is deployed on the terminal 110. After obtaining a to-be-detected image, the terminal 110 inputs the to-be-detected image into the predetermined neural network, extracts a first image feature and a second image feature corresponding to the to-be-detected image by using the predetermined neural network, performs dilated convolution to the second image feature, to obtain a third image feature corresponding to the to-be-detected image, performs classification and regression to the first image feature and the third image feature, to determine candidate position parameters corresponding to a target object in the to-be-detected image and degrees of confidence corresponding to the candidate position parameters, and then selects a valid position parameter from the candidate position parameters according to their corresponding degrees of confidence, and determines a position of the target object in the to-be-detected image according to the valid position parameter.

In other embodiments, the predetermined neural network may be deployed on the server 120 instead of being deployed on the terminal 110. In this case, after obtaining the to-be-detected image, the terminal 110 may send the to-be-detected image to the server 120, and the server 120 completes the foregoing task from inputting the to-be-detected image into the predetermined neural network to determining the position of the target object in the to-be-detected image.

In addition, model training may alternatively be completed on the terminal 110. For example, the terminal 110 may independently complete model training and the task from inputting the to-be-detected image into the predetermined neural network to determining the position of the target object in the to-be-detected image, requiring no participation of the server 120.

The terminal 110 may be a smartphone, a tablet computer, a notebook computer, a desktop computer, a personal digital assistant, a wearable device, or the like, but is not limited thereto. The server 120 may be implemented by an independent physical server or a server cluster that includes a plurality of physical servers. It may be understood that, in FIG. 1, a mobile phone representing the terminal 110 and an independent physical server representing the server 120 is merely an exemplary illustration, and is not intended to limit the terminal 110 and the server 120.

Figure 2:
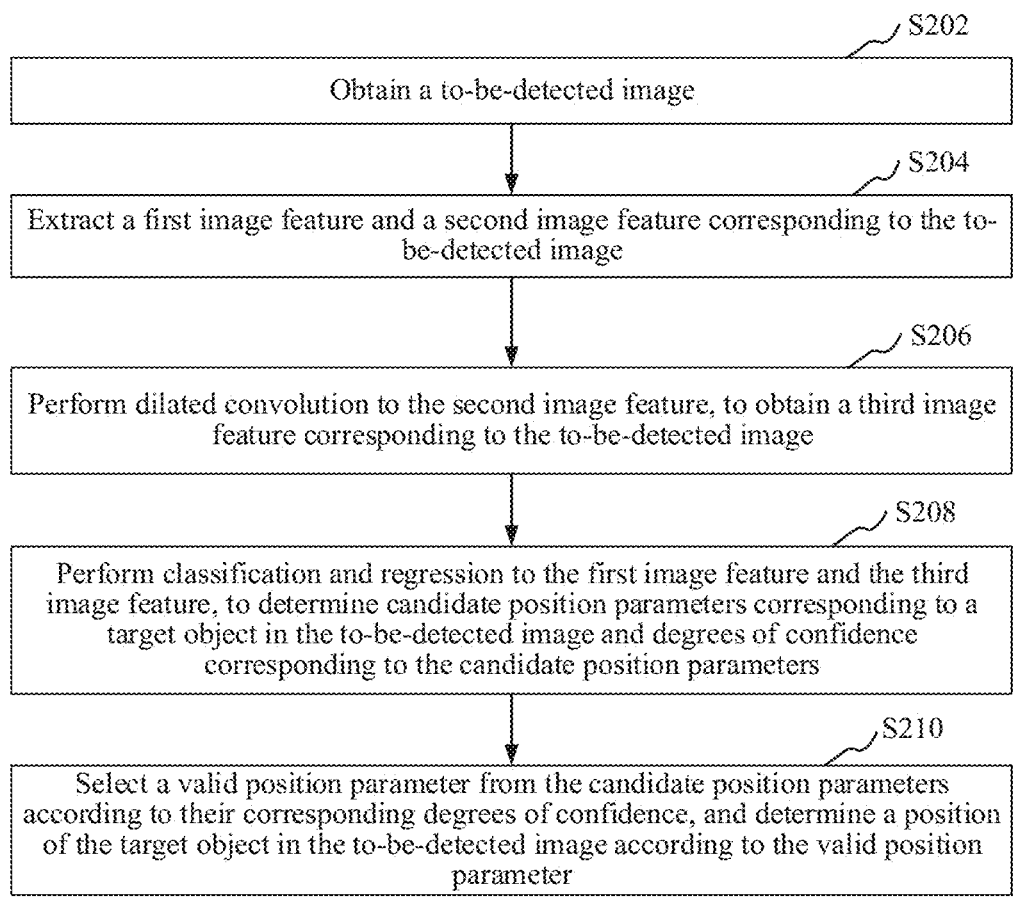
FIG. 2 is a schematic flowchart of a target detection method according to an embodiment.

In an embodiment, as shown in FIG. 2, a target detection method is provided. For example, the method is applied to a computer device (for example, the terminal 110 or the server 120 in FIG. 1). The method may include step S202 to step S210.

S202: Obtain a to-be-detected image.

The to-be-detected image is an image on which target detection needs to be performed. The target detection is intended for determining a position of a target object in the image. The target object is essentially image content, and may be preset according to actual requirements. For example, the target object may be an identification code, a vehicle, a pedestrian, a face, or the like. The identification code may be a QR code, a one-dimensional code (also referred to as a barcode), an applet code, a portable data file (PDF) 417 code, or the like, but neither the target object nor the identification code is limited thereto.

In an embodiment, the to-be-detected image may be an original image that has not been adjusted. In other words, after obtaining the original image, the terminal does not adjust the original image, but directly uses the original image as the to-be-detected image. In another embodiment, the to-be-detected image may alternatively be an image obtained after an original image is adjusted. In other words, after obtaining the original image, the terminal adjusts the original image for better target detection, and then uses the image after the adjustment as the to-be-detected image.

A method for adjusting an image may include adjusting a resolution of the image, or in other words, adjusting a resolution of the original image to a reference resolution preset according to actual requirements. In an embodiment, there may be one preset reference resolution. In this case, resolutions of all to-be-detected images are set to the reference resolution.

In another embodiment, a resolution of the to-be-detected image may be set according to a computing capability of the computer device. In other words, different resolutions may be used for the to-be-detected image when target detection is performed on terminals with different computing capabilities. Optionally, there may be more than one preset reference resolution. A matching relationship between each reference resolution and each piece of terminal description information may be established in advance. The terminal description information is used for representing a terminal computing capability. In this case, step S202 may include the following step: obtaining an original image, obtaining terminal description information used for representing a computer device's computing capability, and adjusting the original image according to a reference resolution that matches the terminal description information, to obtain the to-be-detected image.

In an embodiment, the terminal description information may be classified. Different types of terminal description information represent different terminal computing capabilities, and each type of terminal description information matches each reference resolution. For example, the terminal description information is divided into high-end terminal description information and low-end terminal description information. A terminal computing capability represented by high-end terminal description information is higher than a terminal computing capability represented by low-end terminal description information. High-end terminal description information matches a first reference resolution, low-end terminal description information matches a second reference resolution, and the first reference resolution may be higher than the second reference resolution. For example, the first reference resolution is 512×512, and the second reference resolution is 300×300. It may be understood that distinguishing reference resolutions matching different types of terminal description information can improve accuracy of target detection on high-end terminals and improve timeliness of target detection on low-end terminals.

In addition, the method for adjusting an image can be determined according to actual requirements, but is not limited to adjusting the resolution of the image. For example, the method may also include adjusting attributes, such as contrast, exposure, and color, of the image.

S204: Extract a first image feature and a second image feature corresponding to the to-be-detected image.

Both the first image feature and the second image feature correspond to the to-be-detected image and can be used for reflecting an image trait of the to-be-detected image. The first image feature is an image feature that requires classification and regression, and the second image feature is an image feature that requires dilated convolution.

A quantity of first image features may be an integer greater than or equal to one. When there is more than one first image feature, the more than one first image feature may have different spatial scales. For example, two first image features are extracted. A spatial scale of one first image feature is 19×19, and a spatial scale of the other first image feature is 10×10. Similarly, a quantity of second image features may also be an integer greater than or equal to one. When there is more than one second image feature, the more than one second image feature may also have different spatial scales.

In an embodiment, the first image feature and the second image feature corresponding to the to-be-detected image may be extracted by using a predetermined neural network. In this case, both the first image feature and the second image feature may be feature maps, and their data forms may be vectors.

The predetermined neural network is obtained by performing training in advance to sample images in which positions of the target object have been marked, and has a target detection capability. For example, the target object is an identification code. Massive identification code sample images may be obtained. Any identification code sample image contains the target object, that is, the identification code, and a position of the identification code in the identification code sample image is marked. Therefore, model training may be performed to the massive identification code sample images, to obtain the predetermined neural network. The predetermined neural network may implement end-to-end learning. In other words, the to-be-detected image may be directly inputted into the predetermined neural network, and then the predetermined neural network directly outputs prediction parameters used for predicting the position of the target object in the to-be-detected image, that is, candidate position parameters corresponding to the target object in the to-be-detected image and degrees of confidence corresponding to the candidate position parameters.

S206: Perform dilated convolution to the second image feature, to obtain a third image feature corresponding to the to-be-detected image.

Dilated convolution, also referred to as "atrous convolution", is a convolution method of injecting holes between convolution kernels. Different from common convolution, dilated convolution introduces a hyperparameter referred to as "dilation rate", which defines a spacing between different values when convolution kernels process data.

The third image feature is an image feature obtained by performing dilated convolution to the second image feature. Similar to the first image feature and the second image feature, the third image feature may also be used for reflecting an image trait of the to-be-detected image, and may also be a feature map. A spatial scale of the third image feature may be the same as that of the second image feature. In addition, a quantity of third image features may also be an integer greater than or equal to one. When there is more than one third image feature, the more than one third image feature may have the same spatial scale. For example, the spatial scale of the second image feature is 10×10. Three third image features are obtained after dilated convolution is performed to the second image feature. Three spatial scales of the three third image features are all 10×10.

On the one hand, dilated convolution keeps spatial scales of image features unchanged, thereby avoiding information loss caused by reduction of pixel information of the image features. On the other hand, dilated convolution expands a receptive field, thereby implementing more accurate target detection. The receptive field is an area that a pixel located on a feature map outputted by a hidden layer in the neural network maps on the original image. A larger receptive field of the pixel on the original image indicates a larger range that the pixel maps on the original image and a more global feature with a higher semantic level.

S208: Perform classification and regression to the first image feature and the third image feature, to determine the candidate position parameters corresponding to the target object in the to-be-detected image and the degrees of confidence corresponding to the candidate position parameters.

The candidate position parameters may be used for determining candidate positions of the target object in the to-be-detected image. The degrees of confidence are used for representing a probability that the candidate positions corresponding to the candidate position parameters are the position of the target object in the to-be-detected image. Usually, there is more than one candidate position parameter, and each candidate position parameter has a corresponding degree of confidence.

In an embodiment, performing the classification and regression to the first image feature and the third image feature, to determine the candidate position parameters corresponding to the target object in the to-be-detected image and the degrees of confidence corresponding to the candidate position parameters may be implemented through multibox detection involved in single shot multibox detector (SSD) target detection.

Generally, both the first image feature and the third image feature correspond to several default boxes (that is, bounding boxes). The default boxes are rectangular boxes used for predicting the position of the target object in the to-be-detected image. After classification and regression are performed on each default box, an offset parameter (obtained through regression) corresponding to each default box and a degree of confidence (obtained through classification) corresponding to each default box may be obtained. For any default box, its corresponding offset parameter is used for determining a position of an area that the default box maps on the to-be-detected image, and its corresponding degree of confidence is used for representing a probability that the area that the default box maps on the to-be-detected image includes the target object. The offset parameter corresponding to each default box is each candidate position parameter corresponding to the target object in the to-be-detected image, and the degree of confidence corresponding to each default box is a degree of confidence corresponding to each candidate position parameter.

In addition, for any default box, a position of the default box on a corresponding image feature may be described by using a four-dimensional parameter group, and then regression is performed to the four-dimensional parameter group corresponding to the default box, to obtain an offset parameter corresponding to the default box. The four-dimensional parameter group may include a horizontal coordinate (x) of a position point, a vertical coordinate (y) of the position point, a width (w), and a height (h). The position point is a position point of the default box, and may be a vertex of the default box, a center point of the default box, or the like. The width is a width of the default box and the height is a height of the default box.

For example, for a default box DB1 on the first image feature, a four-dimensional parameter group used for describing a position of the default box DB1 on the first image feature includes a horizontal coordinate of an upper left vertex of the default box DB1 in the first image feature, a vertical coordinate of the upper left vertex in the first image feature, a width of the default box DB1, and a height of the default box DB1.

A position of an area that a default box maps on the to-be-detected image may also be described by using a four-dimensional parameter group. Similarly, the four-dimensional parameter group used for describing the position that the default box maps on the to-be-detected image may include a horizontal coordinate of a position point of the mapped area, a vertical coordinate of the position point, a width of the mapped area, and a height of the mapped area. The position point of the mapped area may be a vertex of the mapped area, a center point of the mapped area, or the like.

In an embodiment, each pixel on the first image feature may correspond to a predetermined quantity of default boxes, and the predetermined quantity may be set according to actual requirements. In an embodiment, a predetermined quantity of default boxes corresponding to the same pixel on the first image feature may have a plurality of aspect ratios and scales. For example, a first image feature F11 is a feature map with a spatial scale of 19×19, and the predetermined quantity is 6. In this case, the first image feature F11 includes 361 (19×19) pixels, each pixel corresponds to six default boxes, and the six default boxes may have a plurality of aspect ratios and scales. Then, there are 2166 (36×6) default boxes on the first image feature F11. Similarly, each pixel on the third image feature may correspond to a predetermined quantity of default boxes, and the predetermined quantity may be set according to actual requirements. In an embodiment, a predetermined quantity of default boxes corresponding to the same pixel on the third image feature may have a plurality of aspect ratios and scales.

S210: Select a valid position parameter from the candidate position parameters according to their corresponding degrees of confidence, and determine the position of the target object in the to-be-detected image according to the valid position parameter.

The valid position parameter is a candidate position parameter that satisfies a predetermined screening condition. The predetermined screening condition may be preset according to actual requirements. For example, the predetermined screening condition may include that a degree of confidence corresponding to a candidate position parameter is greater than a predetermined confidence degree threshold. In other words, a candidate position parameter of which a corresponding degree of confidence is greater than the predetermined confidence degree threshold is used as the valid position parameter. In another example, the predetermined screening condition may include that a candidate position parameter has a highest degree of confidence. In other words, a candidate position parameter of which a corresponding degree of confidence is the highest among the degrees of confidence is used as the valid position parameter.

With reference to the foregoing description, the valid position parameter has a corresponding default box (which is referred to as a valid default box hereinafter). It may be understood that a position of an area that the valid default box maps on the to-be-detected image is the position of the target object in the to-be-detected image. After screening out the valid position parameter, a four-dimensional parameter group may be obtained through decoding and conversion to the valid position parameter. The four-dimensional parameter group is used for describing the position of the area that the valid default box maps on the to-be-detected image, that is, the position of the target object in the to-be-detected image. The four-dimensional parameter group may include a horizontal coordinate of a position point of the target object, a vertical coordinate of the position point, a width of the target object, and a height of the target object. Similarly, the position point of the target object may be a vertex of the target object, a center point of the target object, or the like.

According to the foregoing target detection method, a first image feature and a second image feature corresponding to a to-be-detected image are extracted, dilated convolution is then performed to the second image feature, to obtain a third image feature corresponding to the to-be-detected image, classification and regression are further performed to the first image feature and the third image feature, and a position of a target object in the to-be-detected image is determined according to a result of the classification and regression. In this way, image features corresponding to the to-be-detected image are automatically extracted, and classification and regression are performed to the extracted image features. Therefore, robustness of detection can be effectively improved and detection duration can be effectively shortened. In addition, a receptive field can be effectively expanded through dilated convolution, so that the method can better adapt to detection of target objects with different sizes. In addition, a recall rate for target objects with relatively small sizes is improved.

In an embodiment, the first image feature and the second image feature corresponding to the to-be-detected image are extracted and outputted by using a basic network in the predetermined neural network; dilated convolution is performed to the second image feature by using a dilated convolutional network in the predetermined neural network, to obtain and output the third image feature corresponding to the to-be-detected image; classification and regression are performed to the first image feature and the third image feature by using an output network in the predetermined neural network, to determine the candidate position parameters corresponding to the target object in the to-be-detected image and the degrees of confidence corresponding to the candidate position parameters.

Figure 3:
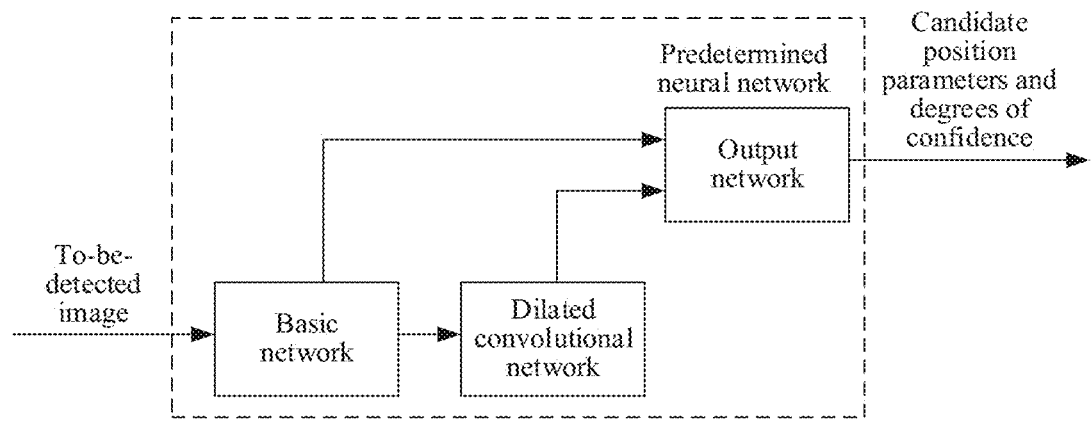
FIG. 3 is a structural block diagram of a predetermined neural network according to an embodiment.

As shown in FIG. 3, in this embodiment, the predetermined neural network may include the basic network, the dilated convolutional network, and the output network. The to-be-detected image is inputted into the predetermined neural network from an input end of the basic network. An output end of the basic network is connected to both an input end of the output network and an input end of the dilated convolutional network. An output end of the dilated convolutional network is connected to the input end of the output network. An output end of the output network is used for outputting the candidate position parameters corresponding to the target object in the to-be-detected image and the degrees of confidence respectively corresponding to the candidate position parameters. The basic network may have a plurality of output ends. An output end of the basic network that is connected to the output network and an output end of the basic network that is connected to the dilated convolutional network may be identical, totally different, or partially identical.

The basic network is a network that can be used for feature extraction. An existing network framework with a feature extraction function, for example, GG-Very-Deep-16 CNN (VGG-16), may be directly used as a network framework of the basic network. Alternatively, the network framework of the basic network may be obtained by reconstructing the existing network framework.

The first image feature is an image feature obtained by applying the basic network to the to-be-detected image and used for outputting to the output network. The second image feature is an image feature obtained by applying the basic network to the to-be-detected image and used for outputting to the dilated convolutional network. The first image feature outputted from the basic network to the output network and the second image feature outputted from the basic network to the dilated convolutional network may be identical, totally different, or partially identical. For example, the basic network outputs two different first image features and one second image feature, and the second image feature is the same as one of the first image features.

The third image feature is an image feature obtained by applying the dilated convolutional network to the second image feature and used for outputting to the output network. The dilated convolutional network is a network that performs feature extraction through dilated convolution. In an embodiment, the dilated convolutional network may be obtained by stacking dilated convolutional layers.

The output network may be used for performing regression to the first image feature and the third image feature, to determine the candidate position parameters corresponding to the target object in the to-be-detected image. In addition, the output network may further be used for performing classification to the first image feature and the third image feature, to determine the degrees of confidence respectively corresponding to the candidate position parameters. The output network may be used for performing regression and classification on default boxes on the first image feature and the third image feature, to obtain offset parameters and degrees of confidence corresponding to the default boxes. In other words, for any default box, the output network outputs an offset parameter corresponding to the default box and a degree of confidence corresponding to the default box. In addition, a network framework of the output network may be implemented by any suitable network framework, provided that classification and regression functions can be implemented, and this is not limited in this application.

In an embodiment, a default box on an image feature outputted at a position closer to the front of the predetermined neural network has a smaller scale, while a default box on an image feature outputted at a position closer to the back of the predetermined neural network has a larger scale. In other words, in the predetermined neural network, the image feature outputted at the position close to the front is used for detecting a small-scale target object, and the image feature outputted at the position close to the back is used for detecting a large-scale target object. For example, in the predetermined neural network, the basic network outputs a first image feature F11 and a first image feature F12 to the output network, and the dilated convolutional network outputs a third image feature F31, a third image feature F32, and a third image feature F33 to the output network. The image features sorted in ascending order of distances between the front of the predetermined neural network and an output position of each image feature are as follows: the first image feature F11, the first image feature F12, the third image feature F31, the third image feature F32, and the third image feature F33. From the first image feature F11 to the third image feature F33, both a scale of a default box on the image feature and a scale of a target object to be detected by using the image feature increase gradually. For example, a scale of a default box on the first image feature F12 is less than a scale of a default box on the third image feature F31, and a scale of a target object to be detected by using the first image feature F12 is less than a scale of a target object to be detected by using the third image feature F31.

In an embodiment, the step of extracting and outputting the first image feature and the second image feature corresponding to the to-be-detected image by using the basic network in the predetermined neural network may include the following steps: sequentially performing convolution and pooling on the to-be-detected image by using a primary feature extraction network in the basic network, to output a first intermediate feature corresponding to the to-be-detected image; and performing feature extraction to the first intermediate feature by using a residual network (ResNet) in the basic network, and outputting the extracted first image feature and second image feature corresponding to the to-be-detected image.

In this embodiment, the basic network in the predetermined neural network includes the primary feature extraction network and the residual network. The primary feature extraction network is a network used for performing feature extraction on the to-be-detected image. The residual network is a network that adds a direct edge to a nonlinear convolutional layer. It may be used for performing further feature extraction on an output result of the primary feature extraction network. A manner in which the residual network performs the feature extraction corresponds to an internal structure of the residual network, and different internal structures may correspond to different feature extraction manners.

In an embodiment, the primary feature extraction network may include a convolutional layer and a pooling layer. The convolutional layer may be used for performing convolution to obtain image features. The pooling layer may be used for performing dimensionality reduction on the image features. Pooling is usually available in two forms, that is, mean pooling and max pooling. In an embodiment, a common 3×3 convolutional layer may be used as the convolutional layer in the primary feature extraction network, and a 3×3 max pooling layer may be used as the pooling layer in the primary feature extraction network. Herein, 3×3 denotes a size of a convolution kernel.

The first intermediate feature is an image feature obtained after the to-be-detected image sequentially undergoes convolution at the convolutional layer in the primary feature extraction network and dimensionality reduction at the pooling layer in the primary feature extraction network.

In this embodiment, the residual network performs feature extraction to its input information, to obtain the first image feature corresponding to the to-be-detected image, outputs the first image feature to the output network of the predetermined neural network, extracts the second image feature corresponding to the to-be-detected image, and outputs the second image feature to the dilated convolutional network of the predetermined neural network. For a residual network at the forefront of the basic network, its input information is the output result of the primary feature extraction network (that is, the first intermediate feature). For a residual network not at the forefront of the basic network, its input information is an output result of a residual network previous to the residual network.

In this embodiment, the residual network is used for constructing the basic network. This can effectively reduce a quantity of parameters and calculation workload, and is advantageous to fast network convergence, thereby effectively resolving the problem of difficulty in deep network training.

In an embodiment, there is more than one residual network in the basic network, and the more than one residual network is connected sequentially. Based on this, the step of performing feature extraction to the first intermediate feature by using a residual network in the basic network, and outputting the extracted first image feature and second image feature corresponding to the to-be-detected image may include the following step: performing feature extraction on the first intermediate feature by using the more than one residual network in the basic network sequentially, outputting the first image feature corresponding to the to-be-detected image by using a first target residual network, and outputting the second image feature corresponding to the to-be-detected image by using a second target residual network.

The first target residual network may be used for outputting the first image feature to the output network of the predetermined neural network. The first target residual network is selected from the more than one residual network included in the basic network. The first target residual network may include one or more residual networks specified in advance in the more than one residual network of the basic network.

The second target residual network may be used for outputting the second image feature to the dilated convolutional network of the predetermined neural network. Similarly, the second target residual network is also selected from the more than one residual network included in the basic network. The second target residual network may include one or more residual networks specified in advance in the more than one residual network of the basic network.

A quantity of the residual networks included in the first target residual network may be large to the greatest extent, to cover first image features with different spatial scales, thereby improving performance of target detection. In addition, the second target residual network generally includes a residual network at the end of the basic network. The residual networks included in the first target residual network and the residual networks included in the second target residual network may be identical, totally different, or partially identical.

For example, the basic network of the predetermined neural network includes the primary feature extraction network, a residual network RN1, a residual network RN2, and a residual network RN3 that are connected sequentially. It may be preset that the first target residual network includes the residual network RN2 and the residual network RN3, and the second target residual network includes the residual network RN3. In this case, after the to-be-detected image is inputted into the basic network, the primary feature extraction network performs convolution and pooling on the to-be-detected image, the residual network RN1 performs feature extraction processing on an output result of the primary feature extraction network, the residual network RN2 performs feature extraction processing on an output result of the residual network RN1, and then the residual network RN3 performs feature extraction processing on an output result of the residual network RN2. The output result of the residual network RN2 and an output result of the residual network RN3 will be outputted as the first image feature to the output network of the predetermined neural network, and the output result of the residual network RN3 will be outputted as the second image feature to the dilated convolutional network of the predetermined neural network.

In an embodiment, the step of performing feature extraction to the first intermediate feature by using a residual network in the basic network, and outputting the extracted first image feature and second image feature corresponding to the to-be-detected image may include the following steps: performing downsampling on the first intermediate feature by using a downsampling module in the residual network, to obtain and output a second intermediate feature; and mapping, by using a first residual block in the residual network, the second intermediate feature to the first image feature and the second image feature corresponding to the to-be-detected image.

Figure 4:
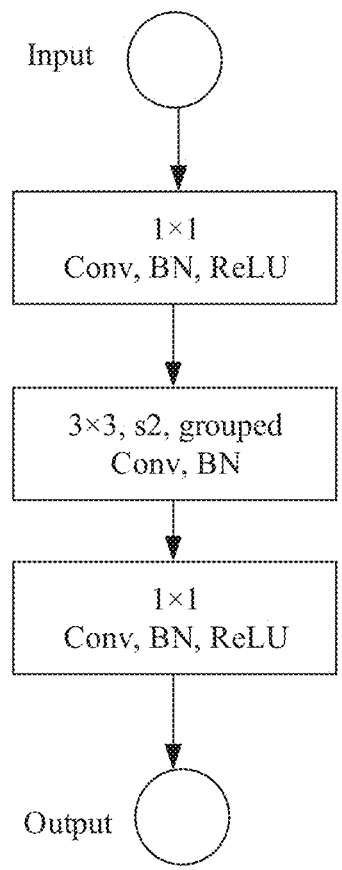
FIG. 4 is a structural block diagram of a downsampling module according to an embodiment.

In this embodiment, the residual network includes the downsampling module and the first residual block. The downsampling module is used for implementing functions similar to those of the pooling layer. In other words, the downsampling module is used for performing dimensionality reduction on image features. As shown in FIG. 4, in an embodiment, the downsampling module may include a common 1×1 convolutional layer, a batch normalization (BN) layer, a rectified linear unit (ReLU) layer, a common 3×3 convolutional layer, a batch normalization layer, a common 1×1 convolutional layer, a batch normalization layer, and a Rectified Linear Units layer that are connected sequentially.

The second intermediate feature is an image feature obtained after the downsampling module in the residual network performs downsampling on the input information of the residual network.

Figure 5:
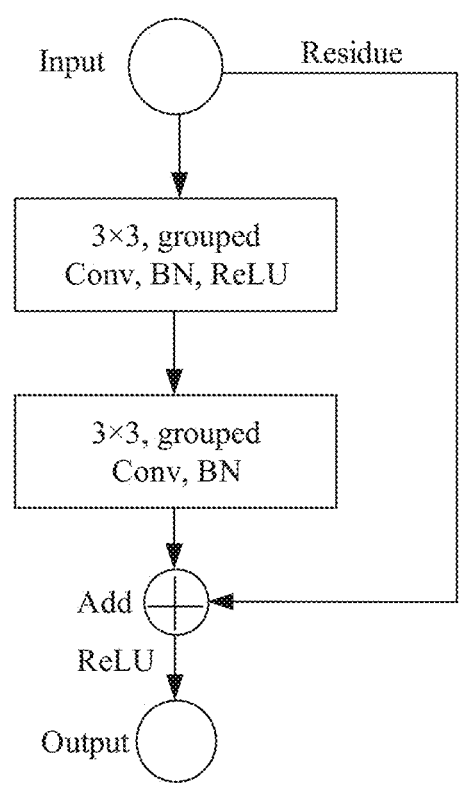
FIG. 5 is a structural block diagram of a residual block according to an embodiment.
Figure 6:
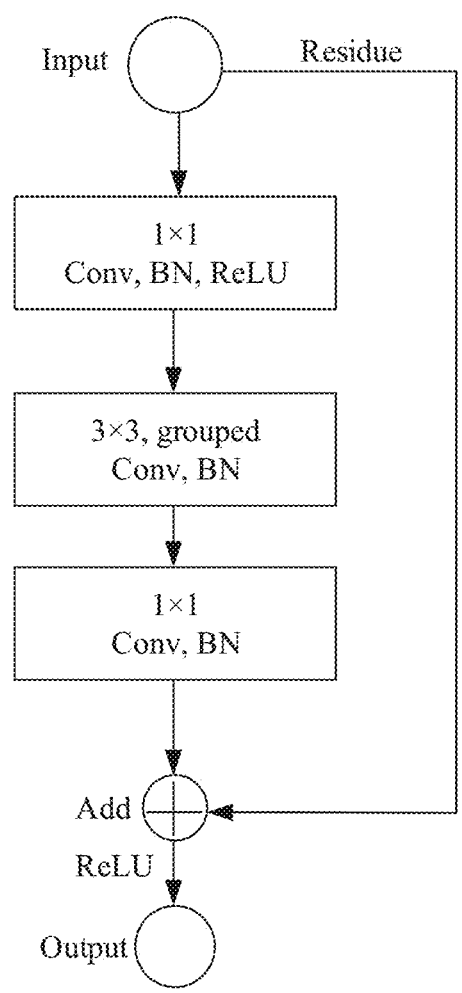
FIG. 6 is a structural block diagram of a residual block according to an embodiment.

A residual block is a basic block of the residual network. The residual block usually includes a residual branch and a short-circuit branch. The residual branch is used for performing nonlinear transformation on the input information of the residual block, and the short-circuit branch is used for performing identical transformation or linear transformation on the input information of the residual block. Correspondingly, the first residual block is a residual block in the basic network. An existing residual block, for example, a conventional residual block shown in FIG. 5 or a bottleneck residual block shown in FIG. 6, may be directly used as the first residual block. Alternatively, the first residual block may be obtained by reconstructing the existing residual block.

A manner in which the first residual block maps the second intermediate feature to the first image feature and the second image feature corresponding to the to-be-detected image corresponds to an internal structure of the first residual block. Different internal structures may correspond to different mapping manners. For example, if the first residual block is the conventional residual block shown in FIG. 5, on a residual branch, the second intermediate feature sequentially undergoes convolution at the common 3×3 convolutional layer, batch normalization processing at the batch normalization layer, nonlinear transformation processing at the rectified linear unit layer, convolution at the common 3×3 convolutional layer, and batch normalization processing at the batch normalization layer. On a short-circuit branch, identical mapping is performed on the second intermediate feature. Further, a computation result of the residual branch and a computation result of the short-circuit branch are synthesized, and nonlinear transformation is performed on a synthesis result by using the rectified linear unit layer, to obtain an output result of the first residual block. In addition, if the first residual block is a first target residual block, an output result of the first residual block is the first image feature corresponding to the to-be-detected image. If the first residual block is a second target residual block, an output result of the first residual block is the second image feature corresponding to the to-be-detected image.

In an embodiment, there is more than one first residual block in the residual network, and the more than one first residual block is connected sequentially. In this case, the step of performing feature extraction on the first intermediate feature by using the more than one residual network in the basic network sequentially, outputting the first image feature corresponding to the to-be-detected image by using a first target residual network, and outputting the second image feature corresponding to the to-be-detected image by using a second target residual network may include the following step: performing feature extraction on the first intermediate feature by using a first residual block in the more than one residual network sequentially, outputting the first image feature corresponding to the to-be-detected image by using a first target residual block in the first target residual network, and outputting the second image feature corresponding to the to-be-detected image by using a second target residual block in the second target residual network.

The first target residual block may be used for outputting the first image feature corresponding to the to-be-detected image to the output network of the predetermined neural network. The first target residual block is selected from first residual blocks in the first target residual network. The first target residual block may include one or more first residual blocks specified in advance in the first residual blocks included in the first target residual network.

The second target residual block may be used for outputting the second image feature corresponding to the to-be-detected image to the output network of the predetermined neural network. Similarly, the second target residual block is selected from first residual blocks in the second target residual network. The second target residual block may include one or more first residual blocks specified in advance in the first residual blocks included in the second target residual network.

In an embodiment, the first target residual block may include a first residual block located at the end of the first target residual network. Because an output result of the first residual block located at the end of the first target residual network traverses a largest quantity of convolutional layers in the first target residual network, the output result of the first residual block located at the end of the first target residual network is outputted as the first image feature to the output network of the predetermined neural network, thereby improving performance of target detection. Similarly, the second target residual block may also include a first residual block located at the end of the second target residual network.

For example, both the first target residual network and the second target residual network include the residual network RN3, and the residual network RN3 includes four first residual blocks, that is, a first residual block RB1, a first residual block RB2, a first residual block RB3, and a first residual block RB4, which are connected sequentially. Assuming that it is preset that both the first target residual block and the second target residual block include the first residual block RB4, after the second intermediate feature is inputted into the residual network RN3, the first residual block RB performs feature extraction on the second intermediate feature, the first residual block RB2 performs feature extraction on an output result of the first residual block RB1, the first residual block RB3 performs feature extraction on an output result of the first residual block RB2, and then the first residual block RB4 performs feature extraction on an output result of the first residual block RB3. An output result of the first residual block RB4 will be outputted as the first image feature to the output network of the predetermined neural network, and also outputted as the second image feature to the dilated convolutional network of the predetermined neural network.

In an embodiment, the step of mapping, by using a first residual block in the residual network, the second intermediate feature to the first image feature and the second image feature corresponding to the to-be-detected image, and outputting the first image feature and the second image feature may include the following steps: performing depthwise separable convolution to the second intermediate feature by using the first residual block in the residual network, to obtain a first feature component; performing identical mapping on the second intermediate feature, to obtain a second feature component; combining the first feature component and the second feature component, to obtain a first target feature; mapping the first target feature to the first image feature and the second image feature corresponding to the to-be-detected image, and outputting the first image feature and the second image feature.

In this embodiment, the first residual block is obtained by reconstructing an existing residual block. The following reconstruction manner may be used: replacing a common 3×3 convolutional layer used for feature extraction in the existing residual block (for example, the residual block shown in FIG. 5 or the residual block shown in FIG. 6) with a depthwise separable convolutional layer.

During depthwise separable convolution, each channel performs convolution by using a convolution kernel, to obtain an output result corresponding to the channel, and then information is fused. Performing feature extraction through depthwise separable convolution can reduce a scale of the basic network and improve a computing speed of the network.

In this embodiment, for the second intermediate feature inputted into the first residual block, on the residual branch, feature extraction is performed on the second intermediate feature by using the depthwise separable convolutional layer, to obtain the first feature component corresponding to the second intermediate feature. On the short-circuit branch, identical mapping is performed on the second intermediate feature, to obtain the second feature component corresponding to a third intermediate feature. Further, the first feature component and the second feature component are combined to obtain the first target feature. Then, nonlinear transformation is performed on the first target feature by using the rectified linear unit layer, to obtain the output result of the first residual block. Combining two feature components may be adding the two feature components together.

In an embodiment, the step of performing depthwise separable convolution to the second intermediate feature, to obtain a first feature component may include the following step: sequentially performing dimensionality reduction, depthwise separable convolution, and dimensionality improvement on the second intermediate feature, to obtain the first feature component.

In this embodiment, the residual branch in the first residual block may include a dimensionality reduction layer, the depthwise separable convolutional layer, and a dimensionality improvement layer that are connected sequentially. The dimensionality reduction layer is used for performing dimensionality reduction on the input information of the residual branch (that is, the second intermediate feature), thereby reducing a quantity of parameters at the depthwise separable convolutional layer. The dimensionality improvement layer is used for performing dimensionality improvement processing on an output result of the depthwise separable convolutional layer, thereby ensuring that an input and an output of the residual branch have the same dimension.

In an embodiment, the dimensionality reduction layer may include a common 1×1 convolutional layer, a batch normalization layer, and a rectified linear unit layer that are connected sequentially. The dimensionality improvement layer may include a common 1×1 convolutional layer and a batch normalization layer that are connected sequentially. In other embodiments, other suitable network structures may be used for the dimensionality reduction layer and the dimensionality improvement layer, and this is not limited in this application.

In this embodiment, after the second intermediate feature is inputted to the residual branch in the first residual block, the dimensionality reduction layer performs dimensionality reduction on the second intermediate feature, the depthwise separable convolutional layer performs convolution on an output result of the dimensionality reduction layer, and then the dimensionality improvement layer performs dimensionality improvement on an output result of the depthwise separable convolutional layer, to obtain the first feature component.

In an embodiment, the step of performing the dilated convolution to the second image feature by using the dilated convolutional network in the predetermined neural network, to obtain the third image feature corresponding to the to-be-detected image may include the following steps: performing the dilated convolution to the second image feature by using a second residual block in the dilated convolutional network, to obtain a third feature component; performing linear mapping on the second image feature, to obtain a fourth feature component; combining the third feature component and the fourth feature component, to obtain a second target feature; and mapping the second target feature to the third image feature corresponding to the to-be-detected image.

The second residual block is a residual block in the dilated convolutional network. Similarly, the second residual block may be obtained by reconstructing an existing residual block. The following reconstruction manner may be used: replacing a common 3×3 convolutional layer used for feature extraction in the existing residual block (for example, the residual block shown in FIG. 5 or the residual block shown in FIG. 6) with a dilated convolutional layer.

In this embodiment, for the second image feature inputted into the second residual block, on a residual branch, feature extraction is performed to the second image feature by using the dilated convolutional layer, to obtain the third feature component. On a short-circuit branch, linear mapping is performed on the second image feature, to obtain the fourth feature component. Further, the third feature component and the fourth feature component are combined to obtain the second target feature. Then, nonlinear transformation is performed on the second target feature by using the rectified linear unit layer, to obtain an output result of the second residual block (that is, the third image feature), and the third image feature is outputted to the output network of the predetermined neural network.

In an embodiment, an additional convolutional layer used for feature extraction is provided on the short-circuit branch of the second residual block. The additional convolutional layer may include a common 1×1 convolutional layer and a batch normalization layer that are connected sequentially. Therefore, on the short-circuit branch, the common 1×1 convolutional layer performs convolution on input information of the second residual block, and then the batch normalization layer performs batch normalization on an output result of the common 1×1 convolutional layer, to obtain the fourth feature component.

In an embodiment, there is more than one second residual block in the dilated convolutional network, and the more than one second residual block is connected sequentially. Therefore, the second image feature outputted by the basic network sequentially undergoes feature extraction of the more than one second residual block in the dilated convolutional network, and output results of the more than one second residual block are all outputted as the third image feature to the output network of the predetermined neural network.

In an embodiment, the step of performing the dilated convolution to the second image feature by using a second residual block in the dilated convolutional network, to obtain a third feature component may include the following step: sequentially performing dimensionality reduction, dilated convolution, and dimensionality improvement on the second image feature, to obtain the third feature component.

Figure 7:
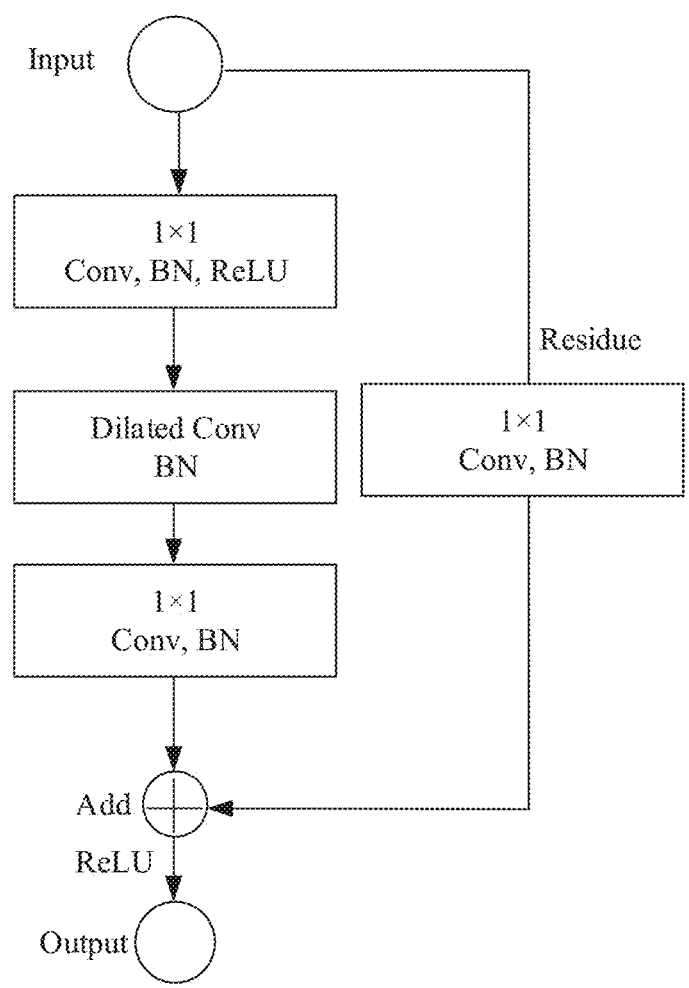
FIG. 7 is a structural block diagram of a second residual block according to an embodiment.

As shown in FIG. 7, in this embodiment, the residual branch in the second residual block includes a dimensionality reduction layer, a dilated convolutional layer, and a dimensionality improvement layer that are connected sequentially.

In this embodiment, for the residual branch in the second residual block, the dimensionality reduction layer performs dimensionality reduction on the input information of the second residual block, the dilated convolutional layer performs feature extraction on an output result of the dimensionality reduction layer, and then the dimensionality improvement layer performs dimensionality improvement on an output result of the dilated convolutional layer, to obtain the third feature component. For a second residual network at the forefront of the dilated convolutional network, its input information is the second image feature. For a second residual network not at the forefront of the dilated convolutional network, its input information is an output result of a residual block previous to the second residual block.

Figure 8:
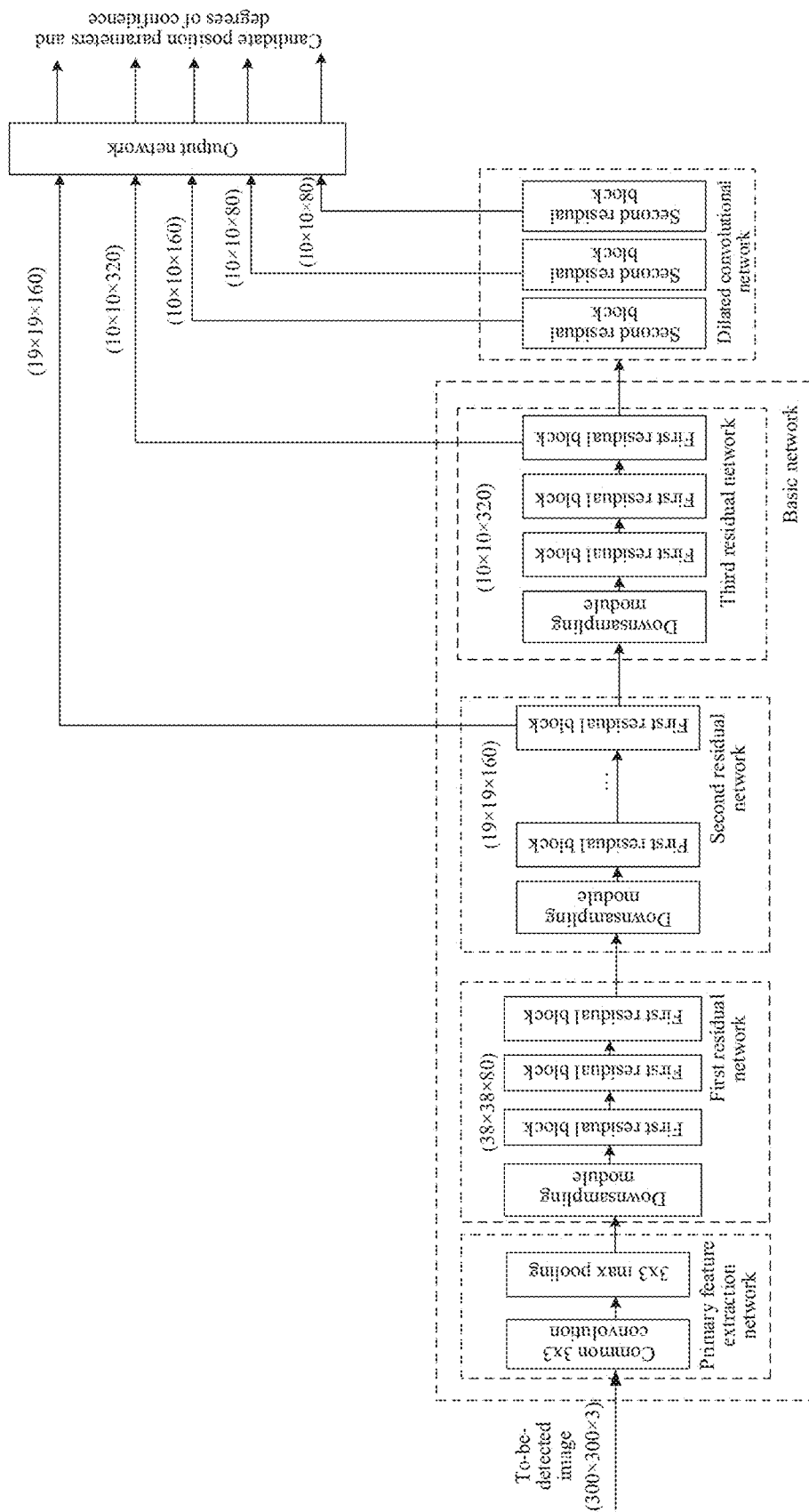
FIG. 8 is a structural block diagram of a predetermined neural network according to an embodiment.

As shown in FIG. 8, an embodiment provides a predetermined neural network. The predetermined neural network includes a basic network, a dilated convolutional network, and an output network. The basic network includes a primary feature extraction network, a first residual network, a second residual network, and a third residual network that are connected sequentially. The primary feature extraction network includes a common 3×3 convolutional layer and a 3×3 max pooling layer that are connected sequentially. The first residual network includes one downsampling module and three first residual blocks that are connected sequentially. The second residual network includes one downsampling module and seven first residual blocks that are connected sequentially. The third residual network includes one downsampling module and three first residual blocks that are connected sequentially. The dilated convolutional network includes three second residual blocks that are connected sequentially.

Figure 9:
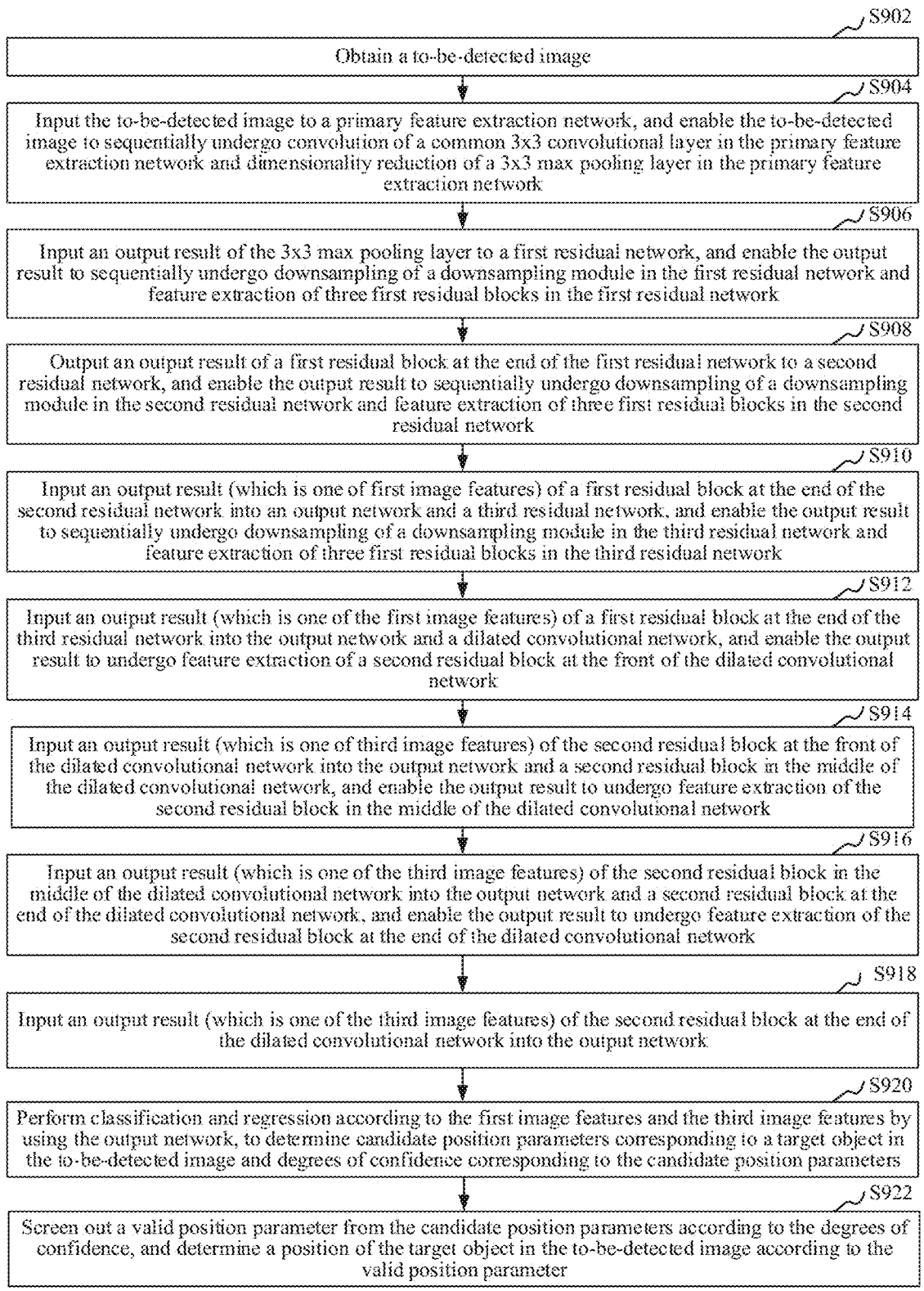
FIG. 9 is a schematic flowchart of a target detection method according to an embodiment.

As shown in FIG. 9, a target detection method implemented by the predetermined neural network shown in FIG. 8 is provided. The method may include step S902 to step S922.

The limitation on the technical features in this embodiment may be the same as the limitation on the corresponding technical features in the foregoing. Details are not described herein.

It is to be understood that, under a proper condition, although the steps in the flowcharts related to the foregoing embodiments are displayed sequentially according to the indications of the arrows, these steps are not necessarily performed sequentially according to the sequence indicated by the arrows. Unless explicitly specified in this application, performing of the steps is not strictly limited, and the steps may be performed in other sequences. Besides, at least some steps may include a plurality of sub-steps or a plurality of stages, the sub-steps or stages are not necessarily performed at a same moment and may be performed at different moments, the sub-steps or stages are not necessarily sequentially performed, and the sub-steps or stages and at least some of other steps or sub-steps or stages of other steps may be performed in turn or alternately.

S902: Obtain a to-be-detected image. The to-be-detected image is a 300×300×3 image. In other words, a scale of the image is 300×300 and a quantity of channels is 3.

S904: Input the to-be-detected image to the primary feature extraction network, and enable the to-be-detected image to sequentially undergo convolution at the common 3×3 convolutional layer in the primary feature extraction network and dimensionality reduction at the 3×3 max pooling layer in the primary feature extraction network.

S906: Input an output result of the 3×3 max pooling layer to the first residual network, and enable the output result to sequentially undergo downsampling of the downsampling module in the first residual network and feature extraction of the three first residual blocks in the first residual network.

S908: Output an output result of a first residual block at the end of the first residual network to the second residual network, and enable the output result to sequentially undergo downsampling of the downsampling module in the second residual network and feature extraction of the three first residual blocks in the second residual network.

S910: Input an output result (which is one of first image features) of a first residual block at the end of the second residual network into the output network and the third residual network, and enable the output result to sequentially undergo downsampling of the downsampling module in the third residual network and feature extraction of the three first residual blocks in the third residual network.

S912: Input an output result (which is one of the first image features) of a first residual block at the end of the third residual network into the output network and the dilated convolutional network, and enable the output result to undergo feature extraction of a second residual block at the front of the dilated convolutional network.

S914: Input an output result (which is one of third image features) of the second residual block at the front of the dilated convolutional network into the output network and a second residual block in the middle of the dilated convolutional network, and enable the output result to undergo feature extraction of the second residual block in the middle of the dilated convolutional network.

S916: Input an output result (which is one of the third image features) of the second residual block in the middle of the dilated convolutional network into the output network and a second residual block at the end of the dilated convolutional network, and enable the output result to undergo feature extraction of the second residual block at the end of the dilated convolutional network.

S918: Input an output result (which is one of the third image features) of the second residual block at the end of the dilated convolutional network into the output network.

S920: Perform classification and regression to the first image features and the third image features by using the output network, to determine candidate position parameters corresponding to a target object in the to-be-detected image and degrees of confidence corresponding to the candidate position parameters.

S922: Select a valid position parameter from the candidate position parameters according to their corresponding degrees of confidence, and determine a position of the target object in the to-be-detected image according to the valid position parameter.

In the predetermined neural network, a quantity of channels at each layer can be scaled uniformly as required. In other words, a network width can be dynamically adjusted, thereby flexibly adjusting a network effect and a network speed. In actual experiments, a small network width coefficient is selected. Finally, a scale of the basic network in the predetermined neural network pre-trained on an ImageNet (an image sample dataset) is 3 M, and top-1 accuracy reaches 56%.

A structure in which a CONV layer, a BN layer, and a Scale (linear transformation) layer in the predetermined neural network successively appear may be merged and simplified into a CONV layer, thereby reducing a network volume and improves the network speed. Experimental results show that after the merging and simplification, the network volume can be reduced by 5% and the network speed can be increased by 5% to 10%.

In addition, if the predetermined neural network is trained on a server by using PyTorch, the predetermined neural network may be converted into a Caffe model to deploy the predetermined neural network obtained through training to a mobile end. During the mobile-end deployment, the Caffe model may be converted to an NCNN model by using a conversion tool embedded in an NCNN framework (an open-source deep learning forward framework developed by Tencent), and formats of model parameters may be converted during the conversion. Experimental results show that the model parameters can be quantized to 16 bits, and a scale of the model can be reduced from 2.1 M to 960K through the simplification operations.

Figure 10:
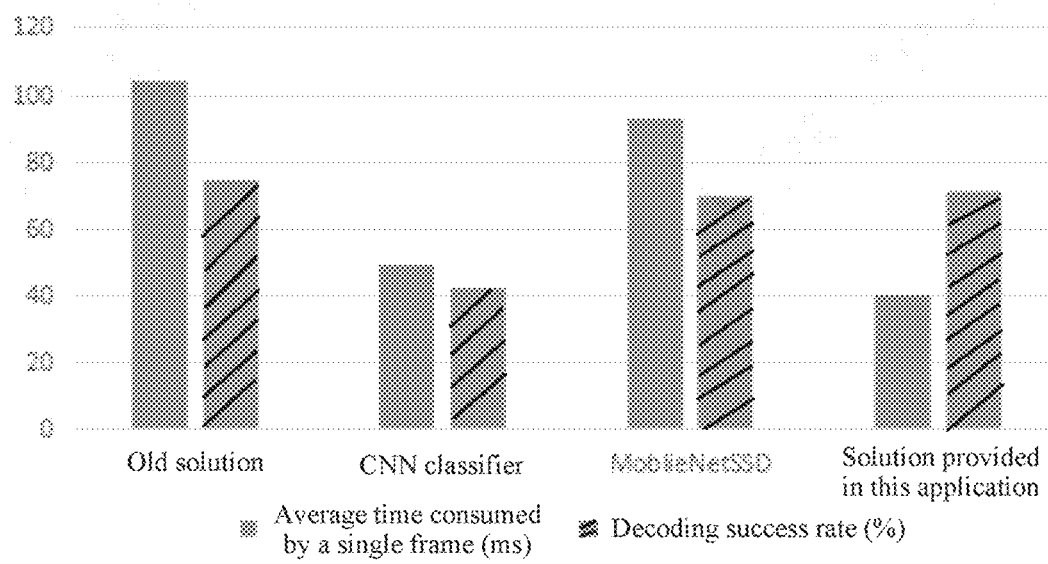
FIG. 10 is a structural block diagram of a target detection apparatus according to an embodiment.

The target detection methods provided in the embodiments of this application may be applied to identification code detection scenarios in which a target object is an identification code. After obtaining a to-be-detected image, a terminal first determines a position of the identification code in the to-be-detected image by using the target detection method provided in any embodiment of this application, and then recognizes the identification code in the to-be-detected image according to the position of the identification code in the to-be-detected image. Therefore, for application scenarios with large images and small identification codes, code-free interference information does not need to be scanned, which can effectively improve performance of the recognition. In addition, the target detection method also supports application scenarios with one image and a plurality of codes. If the to-be-detected image includes more than one identification code, offset parameters are filtered according to their corresponding degrees of confidence, target objects in the to-be-detected image are determined according to a valid offset parameter obtained through the filtering, and it is determined that a quantity of positions at which the target objects are located matches a quantity of identification codes in the to-be-detected image. FIG. 10 shows comparison between average time consumed by a single frame and a decoding success rate in an identification code detection process when the target detection method provided in this application is used and average time consumed by a single frame and a decoding success rate in other existing target detection solutions during actual tests at the mobile end. As can be seen from FIG. 10, the target detection method provided in this application can effectively detect a plurality of identification codes with different scales and angles in real time, providing high accuracy, a high recall rate, and also high comprehensive performance in consideration of running time at the mobile end.

Figure 11:
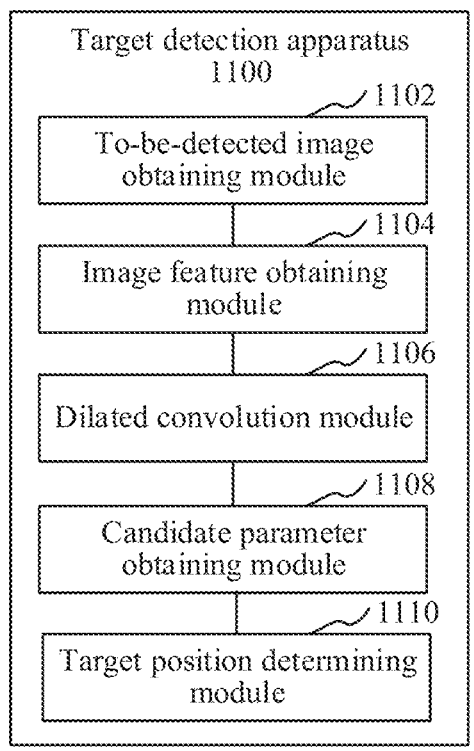
FIG. 11 is a schematic diagram of comparison between indicators in identification code detection according to an embodiment.

As shown in FIG. 11, an embodiment provides a target detection apparatus 1100. The target detection apparatus 1100 may include the following modules 1102 to 1110.

The to-be-detected image obtaining module 1102 is configured to obtain a to-be-detected image.

The image feature obtaining module 1104 is configured to extract a first image feature and a second image feature corresponding to the to-be-detected image.

The dilated convolution module 1106 is configured to perform dilated convolution to the second image feature, to obtain a third image feature corresponding to the to-be-detected image.

The candidate parameter obtaining module 1108 is configured to perform classification and regression to the first image feature and the third image feature, to determine candidate position parameters corresponding to a target object in the to-be-detected image and degrees of confidence corresponding to the candidate position parameters.

The target position determining module 1110 is configured to select a valid position parameter from their corresponding candidate position parameters according to the degrees of confidence, and determine a position of the target object in the to-be-detected image according to the valid position parameter.

According to the foregoing target detection apparatus, a first image feature and a second image feature corresponding to a to-be-detected image are extracted, dilated convolution is then performed to the second image feature, to obtain a third image feature corresponding to the to-be-detected image, classification and regression are further performed to the first image feature and the third image feature, and a position of a target object in the to-be-detected image is determined according to a result of the classification and regression. In this way, image features corresponding to the to-be-detected image are automatically extracted, and classification and regression are performed to the extracted image features. Therefore, robustness of detection can be effectively improved and detection duration can be effectively shortened. In addition, a receptive field can be effectively expanded through dilated convolution, so that the apparatus can better adapt to detection of target objects with different sizes.

In an embodiment, the image feature obtaining module 1104 is configured to extract and output the first image feature and the second image feature corresponding to the to-be-detected image by using a basic network in a predetermined neural network; the dilated convolution module 1106 is configured to perform dilated convolution to the second image feature by using a dilated convolutional network in the predetermined neural network, to obtain and output the third image feature corresponding to the to-be-detected image; the candidate parameter obtaining module 1108 is configured to perform classification and regression to the first image feature and the third image feature by using an output network in the predetermined neural network, to determine the candidate position parameters corresponding to the target object in the to-be-detected image and the degrees of confidence corresponding to the candidate position parameters.

In an embodiment, the image feature obtaining module 1104 may include the following units: a first intermediate feature output unit, configured to sequentially perform convolution and pooling on the to-be-detected image by using a primary feature extraction network in the basic network, to output a first intermediate feature corresponding to the to-be-detected image; and an image feature obtaining unit, configured to perform feature extraction to the first intermediate feature by using a residual network in the basic network, and output the extracted first image feature and second image feature corresponding to the to-be-detected image.

In an embodiment, the image feature obtaining unit may include the following subunits: a downsampling subunit, configured to perform downsampling on the first intermediate feature by using a downsampling module in the residual network, to obtain and output a second intermediate feature; and a residual processing subunit, configured to map, by using a first residual block in the residual network, the second intermediate feature to the first image feature and the second image feature corresponding to the to-be-detected image, and output the first image feature and the second image feature.

In an embodiment, the residual processing subunit may be further configured to: perform depthwise separable convolution to the second intermediate feature by using the first residual block in the residual network, to obtain a first feature component; perform identical mapping on the second intermediate feature, to obtain a second feature component; combine the first feature component and the second feature component, to obtain a first target feature; and map the first target feature to the first image feature and the second image feature corresponding to the to-be-detected image, and output the first image feature and the second image feature.

In an embodiment, the residual processing subunit may be further configured to: sequentially perform dimensionality reduction, depthwise separable convolution, and dimensionality improvement on the second intermediate feature, to obtain the first feature component.

In an embodiment, there is more than one residual network in the basic network, and the more than one residual network is connected sequentially. Based on this, the image feature obtaining unit may be further configured to: perform feature extraction on the first intermediate feature by using the more than one residual network in the basic network sequentially, output the first image feature corresponding to the to-be-detected image by using a first target residual network, and output the second image feature corresponding to the to-be-detected image by using a second target residual network. Both the first target residual network and the second target residual network are selected from the more than one residual network in the basic network.

In an embodiment, there is more than one first residual block in the residual network, and the more than one first residual block is connected sequentially. Based on this, the image feature obtaining unit may be configured to: perform feature extraction on the first intermediate feature by using a first residual block in the more than one residual network sequentially, output the first image feature corresponding to the to-be-detected image by using a first target residual block in the first target residual network, and output the second image feature corresponding to the to-be-detected image by using a second target residual block in the second target residual network. The first target residual block is selected from first residual blocks in the first target residual network, and the second target residual block is selected from first residual blocks in the second target residual network.

In an embodiment, the dilated convolution module 1106 may include the following units: a dilated convolution unit, configured to perform dilated convolution to the second image feature by using a second residual block in the dilated convolutional network, to obtain a third feature component; a linear mapping unit, configured to perform linear mapping on the second image feature, to obtain a fourth feature component; a feature combining unit, configured to combine the third feature component and the fourth feature component, to obtain a second target feature; and a feature mapping unit, configured to map the second target feature to the third image feature corresponding to the to-be-detected image.

In an embodiment, the dilated convolution unit may be further configured to: sequentially perform dimensionality reduction, dilated convolution, and dimensionality improvement on the second image feature, to obtain the third feature component.

In an embodiment, the to-be-detected image obtaining module 1102 may include the following units: an original image obtaining unit, configured to obtain an original image; a description information obtaining unit, configured to obtain terminal description information used for representing a computer device's computing capability; and a resolution adjustment unit, configured to adjust the original image according to a reference resolution that matches the terminal description information, to obtain the to-be-detected image.

In an embodiment, the target object includes an identification code, the identification code including at least one of a QR code, a one-dimensional code, and an applet code.

For limitations on the target detection apparatus, refer to the limitations on the foregoing target detection method, and details will not be repeated herein. All or some of the modules in the target detection apparatus may be implemented through software, hardware, or combinations thereof. The foregoing modules may be built in or independent of a processor of a computer device in a hardware form, or may be stored in a memory of the computer device in a software form, so that the processor invokes and performs an operations corresponding to the foregoing modules.

In an embodiment, a computer device is provided, including a memory and a processor, the memory storing a computer program, the computer program being executed by the processor to implement the steps of the target detection method according to any one of the embodiments of this application.

In an embodiment, the computer device may be the terminal 110 shown in FIG. 1. An internal structure of the computer device may be shown in FIG. 12. The computer device includes a processor, a memory, a network interface, a display screen, and an input apparatus connected through a system bus. The processor is configured to provide computation and control abilities. The memory includes a non-volatile storage medium and an internal memory. The non-volatile storage medium stores an operating system and a computer program, and the internal memory provides an environment for running the operating system and the computer program in the non-volatile storage medium. The computer program is executed by the processor, to implement the target detection method. The network interface is configured to connect to and communicate with an external terminal by using a network. The display screen may be a liquid crystal display screen or an electronic ink display screen. The input apparatus of the computer device may be a touch layer covering the display screen, or may be a button, a trackball, or a touch panel disposed on a housing of the computer device, or may be an external keyboard, touch panel, or mouse.

In an embodiment, the computer device may be the server 120 shown in FIG. 1. An internal structure of the computer device may be shown in FIG. 13. The computer device includes a processor, a memory, a network interface, and a database connected through a system bus. The processor is configured to provide computation and control abilities. The memory includes a non-volatile storage medium and an internal memory. The non-volatile storage medium stores an operating system, a computer program, and a database, and the internal memory provides an environment for running the operating system and the computer program in the non-volatile storage medium. The database is configured to store sample data of a training model. The network interface is configured to connect to and communicate with an external terminal by using a network. The computer program is executed by the processor to implement the target detection method.

Figure 12:
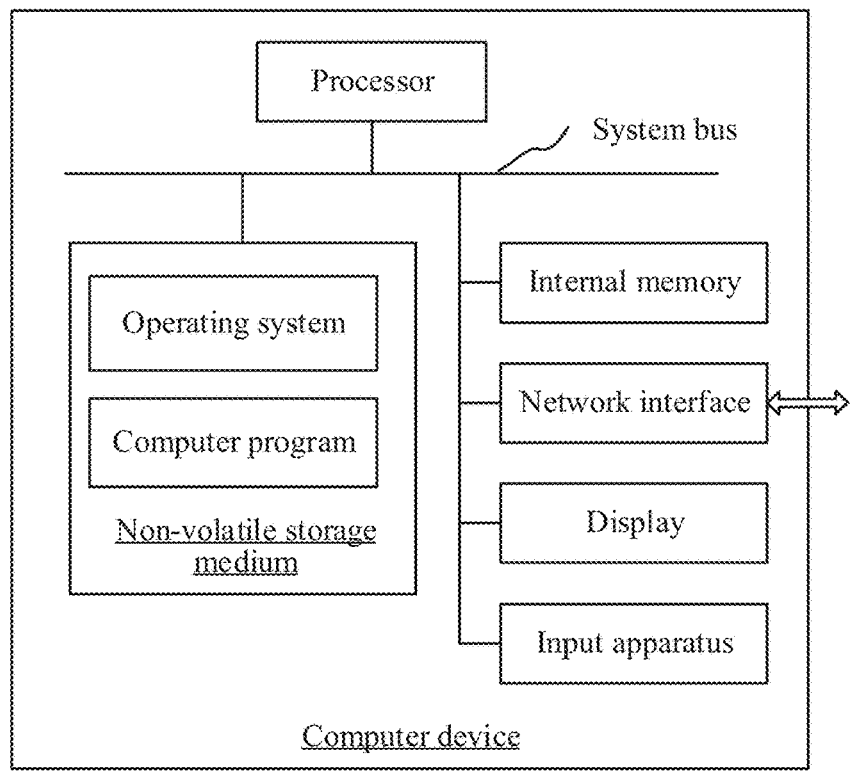
FIG. 12 is a structural block diagram of a computer device according to an embodiment.
Figure 13:
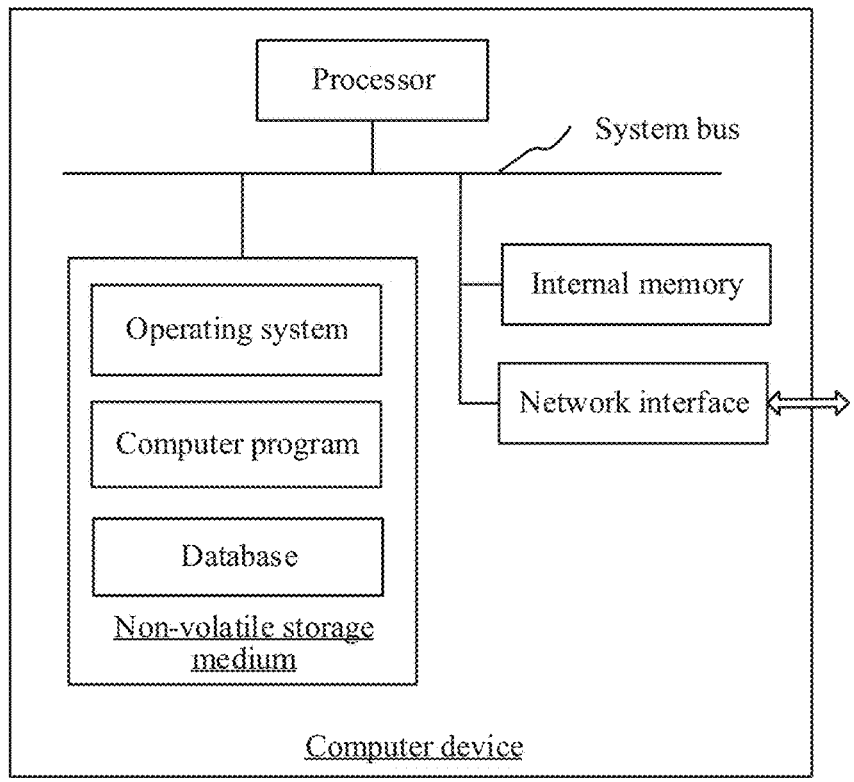
FIG. 13 is a structural block diagram of a computer device according to an embodiment.

A person skilled in the art may understand that the structure shown in FIG. 12 and FIG. 13 is only a block diagram of a partial structure related to the solution of this application, and does not limit the computer device to which the solution of this application is applied. Specifically, the computer device may include more or fewer components than those shown in the figures, or combine some components, or have a different component deployment.

In an embodiment, the target detection apparatus provided in the embodiments of this application may be implemented in a form of a computer program. The computer program may be run on the computer device shown in FIG. 12 or FIG. 13. The memory of the computer device may store various program modules that form the target detection apparatus, for example, the to-be-detected image obtaining module 1102, the image feature obtaining module 1104, the dilated convolution processing module 1106, the candidate parameter obtaining module 1108, and the target location determining module 1110 that are shown in FIG. 11. The computer program formed by the program modules causes the processor to perform the steps in the target detection method in the embodiments of this application described in this specification. For example, the computer device shown in FIG. 12 or FIG. 13 may perform step S202 by using the to-be-detected image obtaining module 1102 in the target detection apparatus shown in FIG. 11, perform step S204 by using the image feature obtaining module 1104, perform step S206 by using the dilated convolution processing module 1106, perform step S208 by using the candidate parameter obtaining module 1108, and perform step S210 by using the target location determining module 1110.

A person of ordinary skill in the art may understand that all or some of the processes of the methods in the foregoing embodiments may be implemented by a computer program instructing relevant hardware. The program may be stored in a non-transitory computer-readable storage medium. When the program is executed, the processes of the foregoing method embodiments may be performed. Any reference to a memory, a storage, a database, or another medium used in the various embodiments provided in this application can include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. As an illustration instead of a limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus direct RAM (RDRAM), a direct Rambus dynamic RAM (DRDRAM), and a Rambus dynamic RAM (RDRAM).

Therefore, in an embodiment, a non-transitory computer-readable storage medium is provided, storing a plurality of computer programs, the computer programs being executed by a processor to implement the target detection method according to any one of the embodiments of this application.

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

The foregoing embodiments only describe several implementations of this application, which are described in detail, but are not to be construed as a limitation to the patent scope of this application. A person of ordinary skill in the art may make various changes and improvements without departing from the ideas of this application, which shall all fall within the protection scope of this application. Therefore, the protection scope of this application shall be subject to the protection scope of the appended claims.

What is claimed is:

1. A target detection method, applied to a computer device having a processor and memory storing a plurality of computer programs to be executed by the processor, the method comprising:
   obtaining a to-be-detected image;
   extracting a first image feature and a second image feature corresponding to the to-be-detected image;
   performing dilated convolution to the second image feature, to obtain a third image feature corresponding to the to-be-detected image;
   performing classification and regression to the first image feature and the third image feature, to determine candidate position parameters corresponding to a first target object and a second target object in the to-be-detected image and degrees of confidence corresponding to the candidate position parameters; and
   selecting a first valid position parameter and a second valid position parameter from the candidate position parameters according to their corresponding degrees of confidence, and determining a first position of the first target object in the to-be-detected image according to the first valid position parameter and a second position of the second target object in the to-be-detected image according to the second valid position parameter, wherein the first target object and the second target object correspond to two different identification codes.

2. The method according to claim 1, wherein
the extracting a first image feature and a second image feature corresponding to the to-be-detected image comprises:
extracting and outputting the first image feature and the second image feature corresponding to the to-be-detected image by using a basic network in a predetermined neural network;
the performing dilated convolution to the second image feature, to obtain a third image feature corresponding to the to-be-detected image comprises:
performing dilated convolution to the second image feature by using a dilated convolutional network in the predetermined neural network, to obtain and output the third image feature corresponding to the to-be-detected image; and
the performing classification and regression to the first image feature and the third image feature, to determine candidate position parameters corresponding to a first target object and a second target object in the to-be-detected image and degrees of confidence corresponding to the candidate position parameters comprises:
performing classification and regression to the first image feature and the third image feature by using an output network in the predetermined neural network, to determine the candidate position parameters corresponding to the first target object and the second target object in the to-be-detected image and the degrees of confidence corresponding to the candidate position parameters.

3. The method according to claim 2, wherein the extracting and outputting the first image feature and the second image feature corresponding to the to-be-detected image by using a basic network in a predetermined neural network comprises:
   sequentially performing convolution and pooling on the to-be-detected image by using a primary feature extraction network in the basic network, to output a first intermediate feature corresponding to the to-be-detected image; and
   performing feature extraction to the first intermediate feature by using a residual network in the basic network, and outputting the extracted first image feature and second image feature corresponding to the to-be-detected image.

4. The method according to claim 3, wherein the performing feature extraction to the first intermediate feature by using a residual network in the basic network, and outputting the extracted first image feature and second image feature corresponding to the to-be-detected image comprises:
  performing downsampling on the first intermediate feature by using a downsampling module in the residual network, to obtain a second intermediate feature; and
  mapping, by using a first residual block in the residual network, the second intermediate feature to the first image feature and the second image feature corresponding to the to-be-detected image, and outputting the first image feature and the second image feature.

5. The method according to claim 4, wherein the mapping, by using a first residual block in the residual network, the second intermediate feature to the first image feature and the second image feature corresponding to the to-be-detected image, and outputting the first image feature and the second image feature comprises:
  performing depthwise separable convolution to the second intermediate feature by using the first residual block in the residual network, to obtain a first feature component;
  performing identical mapping on the second intermediate feature, to obtain a second feature component;
  combining the first feature component and the second feature component, to obtain a first target feature; and
  mapping the first target feature to the first image feature and the second image feature corresponding to the to-be-detected image, and outputting the first image feature and the second image feature.

6. The method according to claim 5, wherein the performing depthwise separable convolution to the second intermediate feature, to obtain a first feature component comprises:
  sequentially performing dimensionality reduction, depthwise separable convolution, and dimensionality improvement on the second intermediate feature, to obtain the first feature component.

7. The method according to claim 4, wherein there is more than one residual network in the basic network, and the more than one residual network is connected sequentially; and
  the performing feature extraction to the first intermediate feature by using a residual network in the basic network, and outputting the extracted first image feature and second image feature corresponding to the to-be-detected image comprises:
  performing feature extraction on the first intermediate feature by using the more than one residual network in the basic network sequentially, outputting the first image feature corresponding to the to-be-detected image by using a first target residual network, and outputting the second image feature corresponding to the to-be-detected image by using a second target residual network;
  wherein both the first target residual network and the second target residual network are selected from the more than one residual network in the basic network.

8. The method according to claim 7, wherein there is more than one first residual block in the residual network, and the more than one first residual block is connected sequentially; and
  the performing feature extraction on the first intermediate feature by using the more than one residual network in the basic network sequentially, outputting the first image feature corresponding to the to-be-detected image by using a first target residual network, and outputting the second image feature corresponding to the to-be-detected image by using a second target residual network comprises:
  performing feature extraction on the first intermediate feature by using a first residual block in the more than one residual network sequentially, outputting the first image feature corresponding to the to-be-detected image by using a first target residual block in the first target residual network, and outputting the second image feature corresponding to the to-be-detected image by using a second target residual block in the second target residual network;
  wherein the first target residual block is selected from first residual blocks in the first target residual network, and the second target residual block is selected from first residual blocks in the second target residual network.

9. The method according to claim 2, wherein the performing dilated convolution according to the second image feature by using a dilated convolutional network in the predetermined neural network, to obtain and output the third image feature corresponding to the to-be-detected image comprises:
  performing dilated convolution according to the second image feature by using a second residual block in the dilated convolutional network, to obtain a third feature component;
  performing linear mapping on the second image feature, to obtain a fourth feature component;
  combining the third feature component and the fourth feature component, to obtain a second target feature; and
  mapping the second target feature to the third image feature corresponding to the to-be-detected image.

10. The method according to claim 9, wherein the performing dilated convolution according to the second image feature, to obtain a third feature component comprises:
  sequentially performing dimensionality reduction, dilated convolution, and dimensionality improvement on the second image feature, to obtain the third feature component.

11. The method according to claim 1, wherein the obtaining a to-be-detected image comprises:
  obtaining an original image; and
  adjusting the original image according to a reference resolution that matches a computing capability of the computer device, to obtain the to-be-detected image.

12. The method according to claim 1, wherein each of the two different identification codes is one of a QR code, a one-dimensional code, and an applet code.

13. A computer device, comprising memory and a processor, the memory storing a plurality of computer programs, the plurality of computer programs, when executed by the processor, causing the computer device to perform a plurality of operations including:
  obtaining a to-be-detected image;
  extracting a first image feature and a second image feature corresponding to the to-be-detected image;
  performing dilated convolution to the second image feature, to obtain a third image feature corresponding to the to-be-detected image;
  performing classification and regression to the first image feature and the third image feature, to determine candidate position parameters corresponding to a first target object and a second target object in the to-be-detected image and degrees of confidence corresponding to the candidate position parameters; and
  selecting a first valid position parameter and a second valid position parameter from the candidate position parameters according to their corresponding degrees of confidence, and determining a first position of the first target object in the to-be-detected image according to the first valid position parameter and a second position of the second target object in the to-be-detected image according to the second valid position parameter, wherein the first target object and the second target object correspond to two different identification codes.

14. The computer device according to claim 13, wherein the extracting a first image feature and a second image feature corresponding to the to-be-detected image comprises:

extracting and outputting the first image feature and the second image feature corresponding to the to-be-detected image by using a basic network in a predetermined neural network;

the performing dilated convolution to the second image feature, to obtain a third image feature corresponding to the to-be-detected image comprises:

performing dilated convolution to the second image feature by using a dilated convolutional network in the predetermined neural network, to obtain and output the third image feature corresponding to the to-be-detected image; and the performing classification and regression to the first image feature and the third image feature, to determine candidate position parameters corresponding to a first target object and a second target object in the to-be-detected image and degrees of confidence corresponding to the candidate position parameters comprises:

performing classification and regression to the first image feature and the third image feature by using an output network in the predetermined neural network, to determine the candidate position parameters corresponding to the first target object and the second target object in the to-be-detected image and the degrees of confidence corresponding to the candidate position parameters.

15. The computer device according to claim 13, wherein the obtaining a to-be- detected image comprises:

obtaining an original image; and adjusting the original image according to a reference resolution that matches a computing capability of the computer device, to obtain the to-be-detected image.

16. The computer device according to claim 13, wherein each of the two different identification codes is one of a QR code, a one-dimensional code, and an applet code.

17. A non-transitory computer-readable storage medium, storing a plurality of computer programs, the plurality of computer programs, when executed by a processor of a computer device, causing the computer device to perform a plurality of operations including:

obtaining a to-be-detected image;

extracting a first image feature and a second image feature corresponding to the to-be- detected image;

performing dilated convolution to the second image feature, to obtain a third image feature corresponding to the to-be-detected image;

performing classification and regression to the first image feature and the third image feature, to determine candidate position parameters corresponding to a first target object and a second target object in the to-be-detected image and degrees of confidence corresponding to the candidate position parameters; and selecting a first valid position parameter and a second valid position parameter from the candidate position parameters according to their corresponding degrees of confidence, and determining a first position of the first target object in the to-be-detected image according to the first valid position parameter and a second position of the second target object in the to-be-detected image according to the second valid position parameter, wherein the first target object and the second target object correspond to two different identification codes.

18. The non-transitory computer-readable storage medium according to claim 17, wherein the extracting a first image feature and a second image feature corresponding to the to-be-detected image comprises:

extracting and outputting the first image feature and the second image feature corresponding to the to-be-detected image by using a basic network in a predetermined neural network;

the performing dilated convolution to the second image feature, to obtain a third image feature corresponding to the to-be-detected image comprises:

performing dilated convolution to the second image feature by using a dilated convolutional network in the predetermined neural network, to obtain and output the third image feature corresponding to the to-be-detected image; and the performing classification and regression to the first image feature and the third image feature, to determine candidate position parameters corresponding to a first target object and a second target object in the to-be-detected image and degrees of confidence corresponding to the candidate position parameters comprises:

performing classification and regression to the first image feature and the third image feature by using an output network in the predetermined neural network, to determine the candidate position parameters corresponding to the first target object and the second target object in the to-be-detected image and the degrees of confidence corresponding to the candidate position parameters.

19. The non-transitory computer-readable storage medium according to claim 17, wherein the obtaining a to-be-detected image comprises:

obtaining an original image; and adjusting the original image according to a reference resolution that matches a computing capability of the computer device, to obtain the to-be-detected image.

20. The non-transitory computer-readable storage medium according to claim 17, wherein each of the two different identification codes is one of a QR code, a one-dimensional code, and an applet code.

* * * * *